3,705,992
BROADBAND TUNABLE RAMAN-EFFECT
DEVICES IN OPTICAL FIBERS
Erich Peter Ippen, Middletown, Chandra Kumar
Naranbhai Patel, Summit, and Rogers Hall Stolen,
Middletown, N.J., assignors to Bell Telephone Laboratories, Incorporated, Murray Hill and Berkeley Heights, N.J.
Filed Dec. 13, 1971, Ser. No. 207,030
Int. Cl. H03f 7/00
U.S. Cl. 307—88.3     7 Claims

ABSTRACT OF THE DISCLOSURE

Stimulated Raman emission in the visible has been observed in glass-fiber optical waveguides. Even though the Raman cross section is quite small, relatively low threshold for Raman emission can be achieved because high optical power densities are maintained over long lengths of waveguide. The broad stimulated gain bandwidths available in glass should permit the construction of wideband fiber amplifiers and Raman oscillators tunable over a range of about 100 angstroms.

BACKGROUND OF THE INVENTION

This invention relates to Raman-effect devices, particularly those of the type in which stimulated effects can be obtained.

In prior art Raman-scattering devices in which stimulated emission has been obtained from the Raman effect, material has typically been used with a high Raman gain, which is associated with a high Raman-scattering cross section, and relatively narrow Raman-scattering linewidth. In general, materials with these properties are liquids.

A more recent development in this field relates to the liquid core capillary tubes providing both optical guiding in the liquid core and a stimulated Raman effect. Such Raman-effect devices are disclosed in the copending patent application of one of us, E. P. Ippen with A. Ashkin, Ser. No. 99,990, filed Dec. 21, 1970 and assigned to the assignee hereof.

The relatively low cross section of the Raman effect in many solids and particularly in glasses has directed the attention of the workers in this art away from glasses for potential Raman-effect devices.

SUMMARY OF THE INVENTION

One aspect of our invention is based upon taking advantage of the fact that the low Raman cross sections of glasses are typically accompanied by very broad Raman-scattering linewidths. We have recognized that, if stimulation could be obtained over a substantial portion of this linewidth, the device would be inherently tunable by an appropriate frequency-selective element.

According to our invention, stimulated Raman-scattering devices employ optical guiding in fused optical fibers, preferably of relatively low loss, which have the above-described low Raman-scattering cross sections and broad linewidths. Relatively low threshold for stimulated Raman emission has been achieved because high optical power densities are maintained over long lengths of waveguide.

According to one feature of our invention, tuning over a wavelength range of the order of 100 angstrom units is provided by any of the following: a rotatable prism reflector or a combination of a coupling lens with chromatic aberrations and a mirror. Their spacing is varied to change the frequency for which occurs optimum coupling back into the fiber. Optimum coupling is different for different frequencies because of the chromatic aberrations of the lens.

According to another feature of our invention, suppression of Brillouin scattering is facilitated by resonating the Raman-scattered light to a greater degree than the pump light. Also, use of a broadband pumping source alleviates the Brillouin scattering problem.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENT

Figure 1:
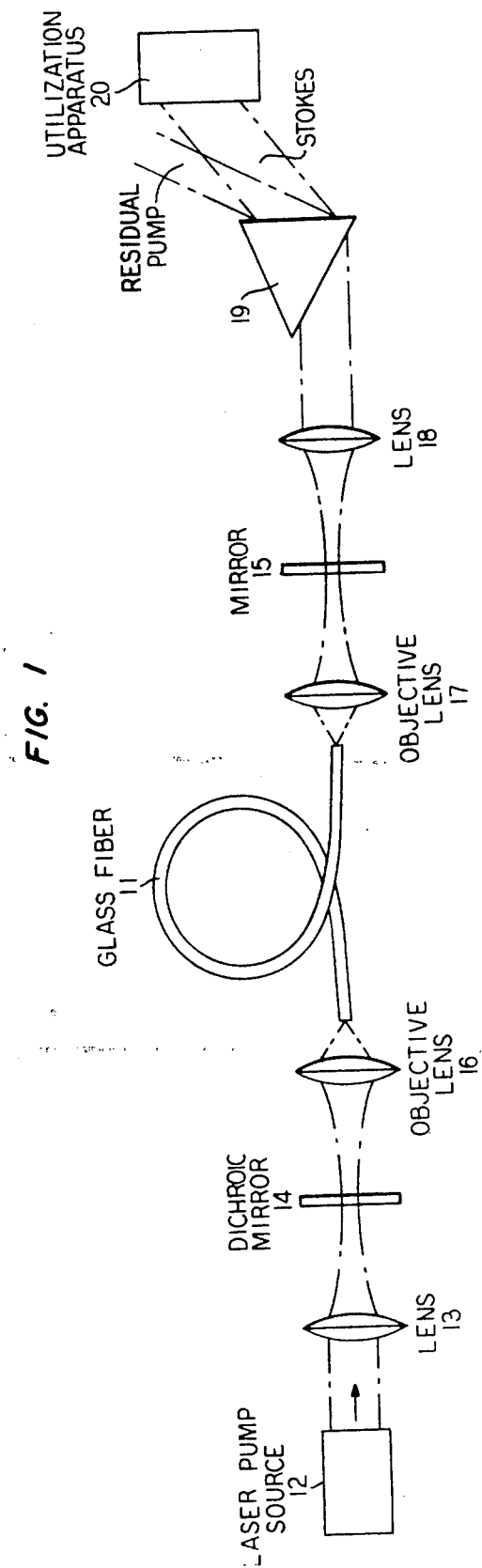
FIG. 1 is a partially pictorial and partially block diagrammatic illustration of a first embodiment of the invention.

The optical fiber oscillator of FIG. 1 is a source of visible light which is tunable over a range of about 100 angstroms. The oscillator comprises the glass fiber 11, typically a single-mode cladded fiber having a core diameter of about 4 micrometers. It is pumped by coherent light from a laser pump source 12 focused by a lens 13 through the dichroic reflector 14 and refocused by the objective lens 16 into one end of the fiber. The pumping light and Raman-scattered light emitted from the other end of glass fiber 11 are focused by the objective lens 17 to the dichroic reflector 15, with part of the Raman-scattered light being transmitted therethrough and the rest returned for another passage through fiber 11. Lens 18 focuses the extracted residual pump light and Raman-scattered light into a collimated beam which is separated by the dispersive prism 19 into its respective pump light and Stokes light components. Stokes light is the component of the Raman-scattered light that is down-shifted in frequency from the pump frequency. The latter light, which is the useful frequency-shifted output, is intercepted by utilization apparatus 20. For the purpose of tuning the Stokes light, the mirror may be replaced by a Littrow prism which has a reflective coating on its back surface. Tuning is accomplished by rotating the Littrow prism.

As background for the explanation of the operation of FIG. 1, it should be pointed out that while the Raman cross section of any glass is very low, two orders of magnitude less than in typical liquids and crystals, this low peak cross section comes about because of a very large scattering linewidth. This linewidth determines the tuning range of the oscillator. The optical waveguiding provided by fiber 11 maintains high optical pumping power densities over long lengths of the fiber 11. It thus overcomes the disadvantage of the low Raman cross section, while retaining the advantage of the wide tuning range. Such a tunable oscillator would be of particular use in the detection and measurement of small quantities of gases in various industrial processes and in pollution control. Thus, utilization apparatus 20 typically represents an apparatus in which such measurements can be made.

It has already been pointed out that dichroic mirror 15 reflects most of the Raman-scattered light and passes substantially all of the pump light. Dichroic mirror 14 is made essentially similar to mirror 15 because it is found that providing only a single pass of the pump light while resonating the Raman-scattered light is effective to suppress Brillouin scattering, which occurs at frequencies close to the pump frequency.

Some of our experiments were performed with a pump wavelength of 532 nanometers, the wavelength of the frequency-doubled output of a pulsed Nd:YAG laser. Another desirable laser pump source would be a pulsed xenon ion laser source 12 having a beam wavelength of 535.5 nanometers. In general, the pump laser source 12 may be any laser source operting in a wavelength range in which the optical loss of the glass is low enough for the intended use. It is also desirable that it provide a pulse long enough that the oscillator light can make many round trips in the cavity during the duration of the pump pulse.

In operation, we have observed the stimulated Raman emission in an embodiment like that of FIG. 1. Specifically, the stimulated Raman scattering was obtained both as a single-pass, superradiant emission in the case in which mirrors 14 and 15 were absent and as the output of the oscillator which exists when mirrors 14 and 15 are present.

Stokes emission from the fiber 11 was observed at 545 nanometers when pumped at a wavelength of 532 nanometers. The Stokes frequency shift was about 460 cm.$^{-1}$.

The power necessary to observe Stokes emission from a 9 meter fiber was about 75 watts. This threshold corresponded to a power density of about 600 megawatts per square centimeter and a stimulated Raman gain of about $e^{27}$.

In other experiments the oscillator of FIG. 1 was constructed using a 190 centimeter length of fiber 11. Reflector 14 was coated so that about 60 percent of the pump light was transmitted; while the reflectivity at the Stokes wavelength was about 98 percent. In that same experiment the mirror 15 had a broadband reflectivity of about 98 percent. With about 40 power microscope objective lenses 16 and 17, about 70 percent of the energy emerging from the fiber could be fed back into it. Oscillation was observed with about 500 watts of power in the fiber and a power density of about 400 megawatts per square centimeter. Tilting the output mirror 15 eliminated the Stokes emission and verified that the system was oscillating.

Figure 2:
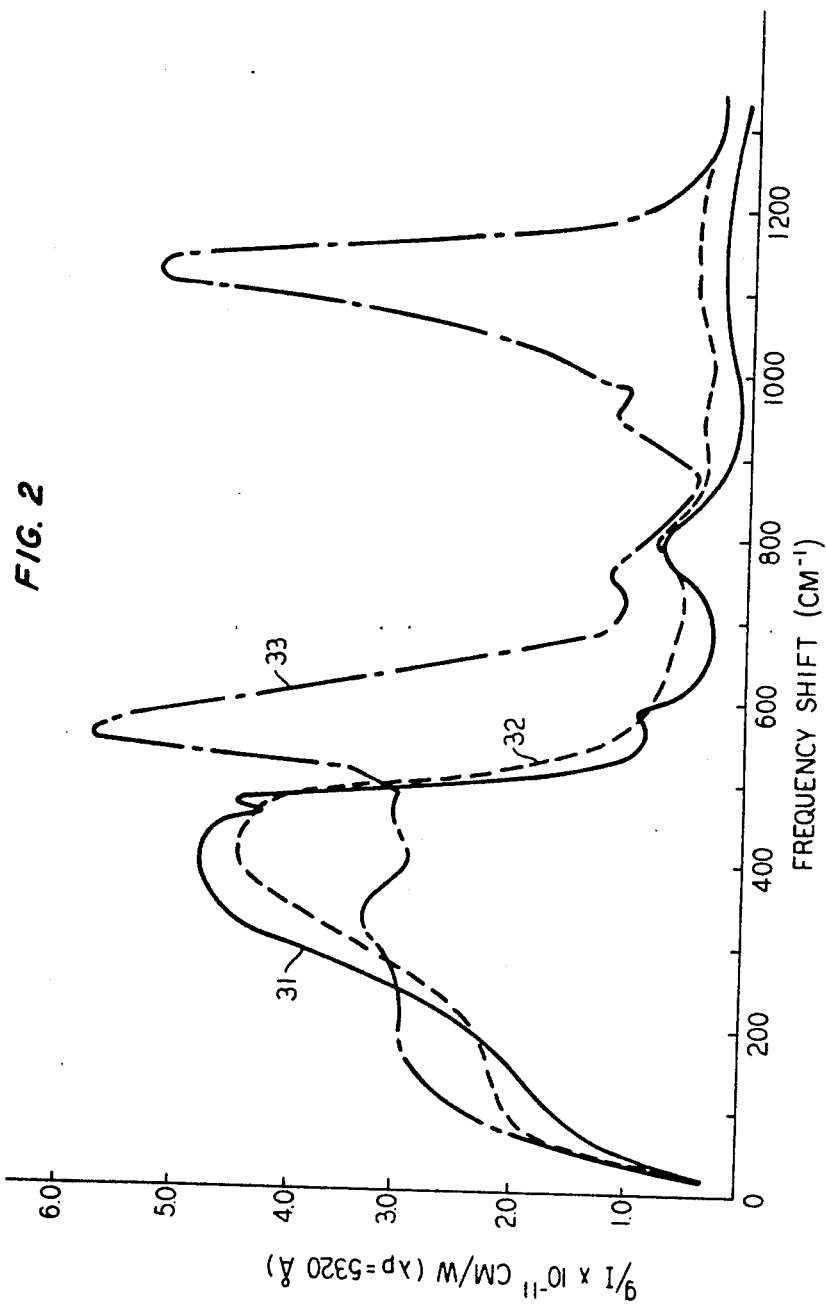
FIG. 2 shows curves which are useful in explaining the operation of the invention.

Further data relative to the embodiment of FIG. 1 may be of interest and is given as follows. In most glasses the Raman gain curve is a broad band between about 20 cm.$^{-1}$ to 550 cm.$^{-1}$. The gain $g/I$ is related to the differential cross section, $\sigma$, by the relation:

$$\frac{g}{I} = \frac{\sigma \lambda_s^3 \cdot 10^7}{c^2 h \epsilon (n+1) n_p^2} \text{ cm./watt} \quad (1)$$

where $\lambda_s$ is the Stokes wavelength, and $c$ the velocity of light all in cgs. units. I is the pump intensity in w cm.$^{-2}$, $\epsilon$ is the dielectric constant at the Stokes wavelength, $h$ is Planck's constant, and $n$ the Bose-Einstein population factor. $n_p$ is the effective refractive index at pump frequency. For illustration, the gain curves of three different glasses are shown in FIG. 2. Curve 31 is for fused quartz; curve 32 is for Pyrex®; and curve 33 is for soda-lime silicate in the ratio of 20:10:70. The ordinate is normalized gain.

These gain curves were reduced from spontaneous scattering data taken using a continuous argon laser (514.5 nanometers) and a double spectrometer. Laser power was 200 milliwatts and the spectral resolution was 5 cm.$^{-1}$. The Raman cross section is directly proportional to the intensity of the spontaneous Raman spectrum. The maximum gain differs very little from glass to glass and is about $5 \times 10^{-11}$ cm./watt (=$g/I$) for a pump at 532 nanometers. The figure for the gain was established by a comparison of the scattered intensity in the glasses with the peak intensities in crystal quartz and benzene for which the absolute Raman-scattering cross sections have been carefully measured. The maximum differential cross section in fused quartz was a factor of 25 less than the peak differential cross section of the 464 cm.$^{-1}$ line in crystal quartz.

The amplification for a single pass in a long fiber can be calculated from the relation:

$$\ln(P_s^{out}/P_s^{in}) = (g/\alpha) \cdot F \cdot (P_p^{in}/\pi r^2)$$
$$(1-e^{-\alpha L}) - \alpha L \quad (2)$$

where $P_s$ and $P_p$ are the signal and pump powers, $\alpha$ is the linear loss coefficient, L is the length, and F is the coupling coefficient between guide modes.

With the long fiber, stimulated Brillouin scattering in the backward direction was also observed. No backward Raman radiation was seen. The gain coefficient, $g/I$, for stimulated Brillouin scattering in fused quartz is about $3 \times 10^{-9}$ cm./watt. This was calculated using data for fused quartz for which the Brillouin shift at 532 nanometers is 32.8 gHz. and the linewidth (FWHM) is about 93 mc. (assuming a linear increase from the measured value at 632.8 nanometers). The elasto-optic coefficient is .271. The Brillouin gain is not expected to be significantly different in different glasses. Upon first consideration, the large Brillouin gain might be expected to interfere with the observation of stimulated Raman scattering.

Acually, the Raman process can dominate because of the relatively broadband nature of the pump. The efficiency for pumping the Brillouin line is decreased by the ratio of the Brillouin linewidth to that of the pump. For the Raman line the gain curve is much larger than the pump linewidth and all of the pump power is effective. After including the relative linewidths of typical pump and Brillouin lines the Raman and Brillouin gains are about the same. Use of selectively coated mirrors in an oscillator configuration to resonate the Raman-scattered radiation primarily, or exclusively, should also discriminate against stimulated Brillouin scattering.

It is important to point out that the use of longer, low-loss fibers will lead to the observation of stimulated scattering at much lower power levels than we have a reported here. With the gains we have demonstrated and with presently achievable fiber losses, one can expect strong stimulated Raman scattering and stimulated Brillouin scattering at power levels of several watts. The nonlinear loss introduced by this scattering will provide an additional constraint on the design of glass-fiber, optical communication systems.

Figure 3:
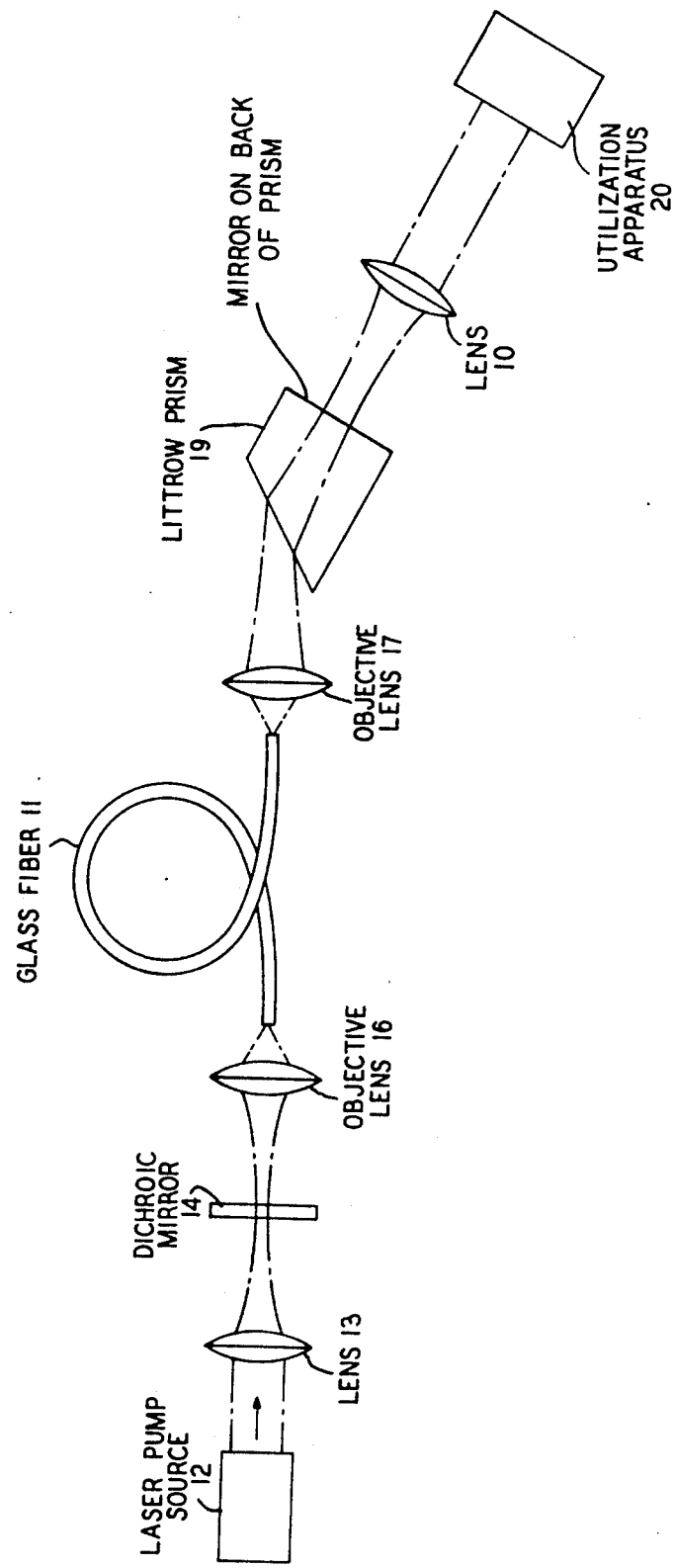
FIG. 3 is a partially pictorial and partially block diagrammatic showing of a modification of the embodiment of FIG. 1 using a prism tuning apparatus.

In the embodiment of FIG. 3, tuning is provided by slight reorientations of the dispersive prism 19, since differing frequencies are internally refracted in prism 19 at slightly different angles. The Stokes frequency which strikes the output reflective surface at essentially normal incidence will be the frequency which is resonated.

Figure 4:
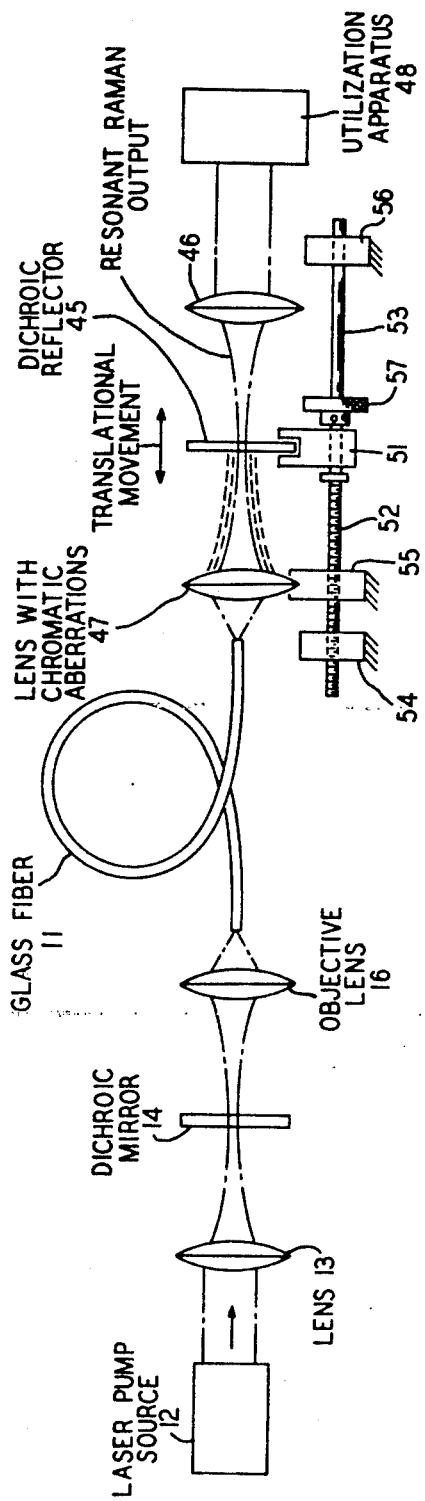
FIG. 4 is a partially pictorial and partially block diagrammatic illustration of another modification of the embodiment of FIG. 1 using a chromatic aberration type of tuning apparatus for our invention.

Tuning can also be accomplished in other ways, as illustrated in the modified embodiment of FIG. 4. In brief, the embodiment of FIG. 4 employs the inherent chromatic aberrations of a lens.

In the modified tuning technique of FIG. 4, the lens 17 and prism 19 of FIG. 3 are replaced by a combination of components which includes most importantly a lens 47 that has chromatic aberration and a dichloric reflector 45 that can be translated axially to change its spacing with respect to lens 47. This spacing is illustratively changed by the thumb screw 57 which pushes on the mount 51 of reflector 45 as the screw threads are advanced through stationary mounts 54 and 55 or retracted therefrom. Illustratively, the stationary mount 55 holds the lens 47.

The operation of the tuning technique of FIG. 4 can be easily understood if it is assumed that lens 47 is designed with an attempt to increase rather than to correct for chromatic aberrations. In that event, different colors or wavelengths of light will be focused at slightly different distances from lens 47. Therefore, the optimum position of the lens with respect to reflector 45 will be different for different wavelengths. The oscillator will tend to oscillate at the wavelength for which the spacing between the lens 47 and reflector 45 is most nearly optimum.

Many other modifications of the disclosed embodiments can be made. For example, the experiments could also be done with a continuous-wave argon ion laser source 12 having a pump wavelength of 514.5 nanometers.

Figure 5:
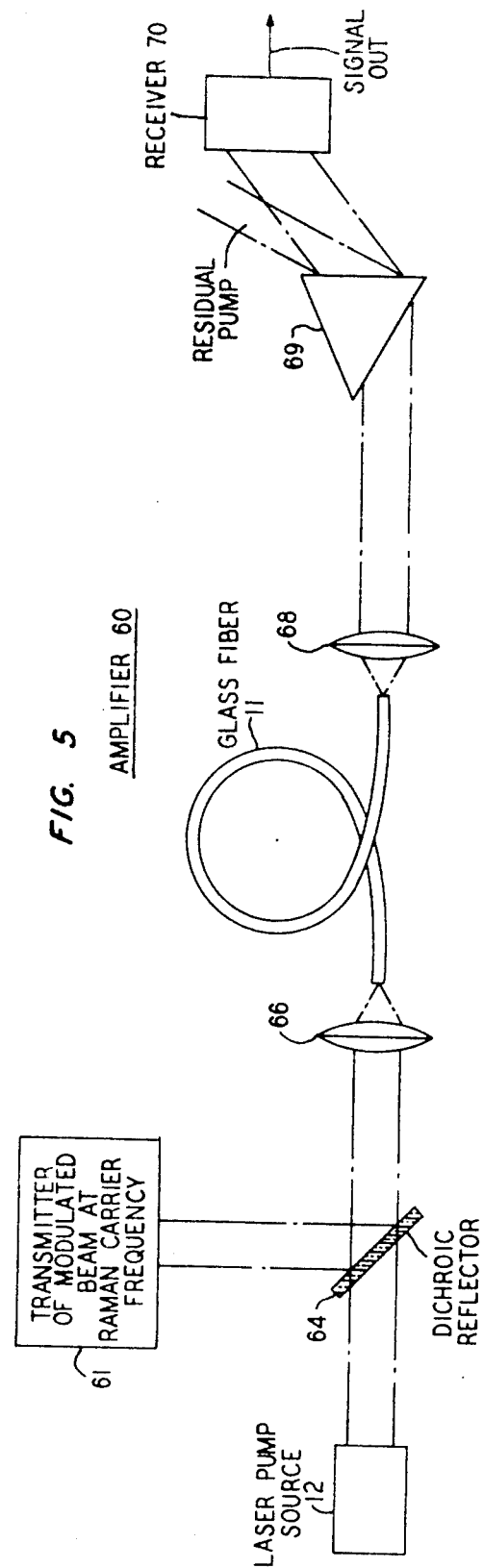
FIG. 5 shows a modification of the embodiment of FIG. 1 for use as an amplifier in an optical communication system.

It is feasible to construct broad band fiber amplifiers as well as wavelength tunable oscillators. Such an amplifier is shown in FIG. 5. The embodiment of FIG. 5 differs from the embodiment of FIG. 1 in the elimination of the optical resonator, modification of the lenses that coupled collimated beams into and out of the fiber and the provision of an oblique dichroic reflector 64 for combining with the pumping beam a modulated beam at the Raman carrier frequency from a communication transmitter 61. The receiver 70 now replaces apparatus 20 of FIG. 1 and demodulates the amplified modulated beam at the Raman carrier frequency to yield the information signal as its output.

The modulated beam from transmitter 61 is amplified by stimulated Raman scattering.

In other respects, the embodiment of FIG. 5 is constructed and operated in the same way as the embodiment of FIG. 1.

Figure 6:
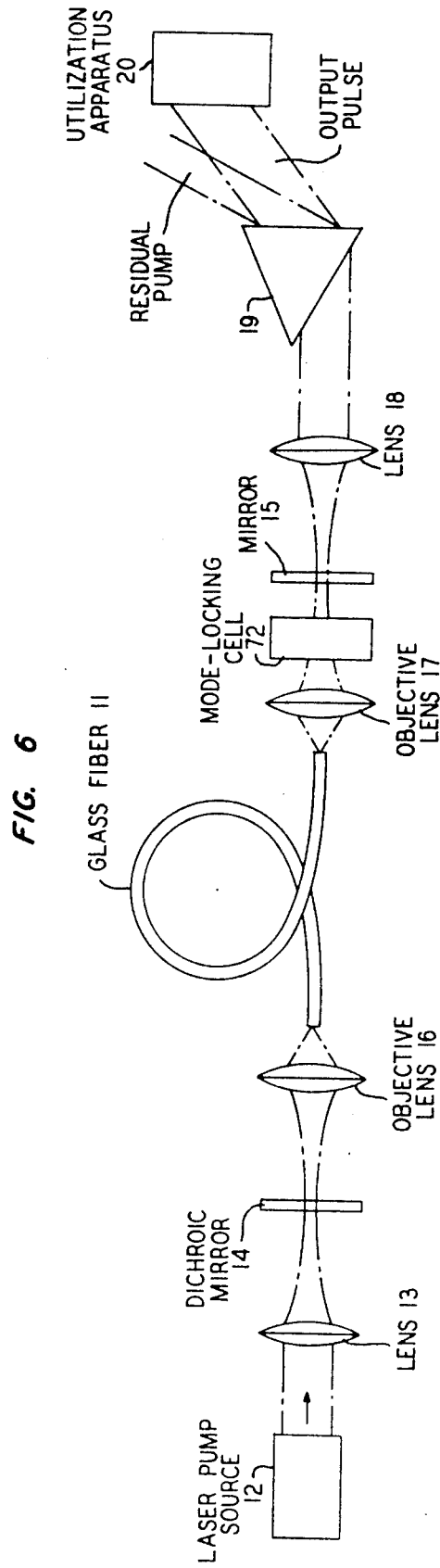
FIG. 6 shows another modification of the embodiment of FIG. 1 for use as a generator of sub-picosecond pulses.

The embodiment of FIG. 6 differs from the embodiment of FIG. 1 in the provision of the mode-locking cell 72, typically a dilute saturable absorption diethyloxydicarbocyanine (DODC) dye cell in the resonator to provide sub-picosecond ($<10^{-9}$ sec.) output pulses of the Raman radiation. These pulses are useful for laboratory instruments and optical communication.

We claim:

1. Raman-scattering device comprising a fused optical fiber having optical waveguiding properties, means for transmitting a coherent optical pumping beam through said fiber in a waveguide mode, and means for selectively resonating in said fiber a Raman-scattered beam of wavelength longer than the wavelength of said pumping beam, said transmitting means and said resonating means cooperating to suppress Brillouin scattering.

2. A Raman-scattering device according to claim 1 in which said transmitting means includes at least one dichroic reflectivity with a lower reflectivity for the pumping beam than for the Raman-scattered beam.

3. A Raman-scattering device according to claim 1 in which the resonating means includes means for tuning the resonated beam.

4. A Raman-scattering device according to claim 3 in which the tuning means comprises a dispersive prism associated with the resonating means and adapted for angular adjustment about an axis transverse to the axis of the resonating means.

5. Raman-scattering device according to claim 3 in which the tuning means comprises a lens disposed within the resonating means and characterized by chromatic aberrations and a reflector disposed to reflect Raman-scattered light back through said lens toward the fiber, said reflector being movable axially with respect to said lens to optimize the resonating means for a selected wavelength portion of the Raman-scattered light.

6. A Raman-scattering device comprising a fused optical fiber having optical waveguiding properties, means for transmitting a coherent optical pumping beam through said fiber in a waveguide mode to yield a Raman-scattered optical beam, said transmitting means including means for combining with said pumping beam a modulated beam at the frequency of the Raman-scattered optical beam prior to enry into said fiber, and means for supplying said modulated beam to stimulate the Raman scattering, whereby an amplified modulated beam is emitted from said fiber.

7. A Raman-scattering device according to claim 1 including means within the resonating means for mode-locking the Raman-scattered beam to produce a train of sub-picosecond pulses in cooperation with said pumping beam transmitting means and said fiber.

References Cited

Ippen: "Applied Physics Letters," Apr. 15, 1970, pp. 303–305.

JOHN KOMINSKI, Primary Examiner

D. R. HOSTETTER, Assistant Examiner

U.S. Cl. X.R.

321—69 R; 330—4.5; 331—94.5, 107 R